United States Patent
Jumpertz et al.

(10) Patent No.: US 9,899,059 B2
(45) Date of Patent: Feb. 20, 2018

(54) METHOD OF MANAGEMENT OF A MULTIMEDIA PROGRAM, SERVER, TERMINALS, SIGNAL AND CORRESPONDING COMPUTER PROGRAMS

(75) Inventors: Sylvie Jumpertz, Rennes (FR); Christophe Cutullic, Domloup (FR)

(73) Assignee: Orange, Paris (FR)

( * ) Notice: Subject to any disclaimer, the term of this patent is extended or adjusted under 35 U.S.C. 154(b) by 480 days.

(21) Appl. No.: 12/377,876

(22) PCT Filed: Aug. 17, 2007

(86) PCT No.: PCT/FR2007/051826
§ 371 (c)(1),
(2), (4) Date: Apr. 28, 2009

(87) PCT Pub. No.: WO2008/023129
PCT Pub. Date: Feb. 28, 2008

(65) Prior Publication Data
US 2010/0017457 A1    Jan. 21, 2010

(30) Foreign Application Priority Data
Aug. 24, 2006 (FR) ...................... 06 07496

(51) Int. Cl.
*G06F 13/00* (2006.01)
*G11B 27/11* (2006.01)
(Continued)

(52) U.S. Cl.
CPC ............... *G11B 27/11* (2013.01); *H04N 5/76* (2013.01); *H04N 7/17318* (2013.01);
(Continued)

(58) Field of Classification Search
CPC ...... G11B 27/11; H04N 5/76; H04N 7/17318; H04N 9/8042; H04N 9/8205; H04N 21/8455; H04N 21/47202; H04N 21/4786; H04N 21/4788; H04N 21/6581; H04N 21/4325
(Continued)

(56) References Cited

U.S. PATENT DOCUMENTS

| | | | |
|---|---|---|---|
| 6,717,507 B1 | 4/2004 | Bayley et al. | |
| 7,356,567 B2 * | 4/2008 | Odell | G06Q 10/107 709/206 |
| 7,877,450 B2 * | 1/2011 | Odell | G06Q 10/107 709/206 |
| 8,370,429 B2 * | 2/2013 | Odell | G06Q 10/107 709/203 |

(Continued)

FOREIGN PATENT DOCUMENTS

| | | |
|---|---|---|
| EP | 1 376 586 A1 | 1/2004 |
| EP | 1 596 594 A1 | 11/2005 |
| JP | 2002-244955 A | 8/2002 |

*Primary Examiner* — Kenneth R Coulter
(74) *Attorney, Agent, or Firm* — Drinker Biddle & Reath LLP

(57) ABSTRACT

The invention relates to a method for managing a multimedia program, played back by a terminal of a user.
According to the invention, such a method comprises the following steps:
  playback (201) of said multimedia program, by a terminal;
  obtaining (205) of a marking cue relating to an instant of playback of said multimedia program, associated with a marking request generated by order of a user of said terminal;
  use (209) of said marking cue to play back said multimedia program later starting from said instant of playback.

9 Claims, 4 Drawing Sheets

(51) Int. Cl.

| | |
|---|---|
| *H04N 5/76* | (2006.01) |
| *H04N 7/173* | (2011.01) |
| *H04N 9/804* | (2006.01) |
| *H04N 9/82* | (2006.01) |
| *H04N 21/432* | (2011.01) |
| *H04N 21/472* | (2011.01) |
| *H04N 21/4786* | (2011.01) |
| *H04N 21/4788* | (2011.01) |
| *H04N 21/658* | (2011.01) |
| *H04N 21/845* | (2011.01) |

(52) U.S. Cl.
CPC ......... *H04N 9/8042* (2013.01); *H04N 9/8205* (2013.01); *H04N 21/4325* (2013.01); *H04N 21/4786* (2013.01); *H04N 21/4788* (2013.01); *H04N 21/47202* (2013.01); *H04N 21/6581* (2013.01); *H04N 21/8455* (2013.01)

(58) Field of Classification Search
USPC ......... 709/202, 217–219, 231, 204–207, 223
See application file for complete search history.

(56) References Cited

U.S. PATENT DOCUMENTS

| | | | |
|---|---|---|---|
| 2004/0008970 A1* | 1/2004 | Junkersfeld et al. | 386/69 |
| 2004/0028378 A1* | 2/2004 | Shimizu et al. | 386/68 |
| 2004/0139047 A1* | 7/2004 | Rechsteiner et al. | 707/1 |
| 2004/0223737 A1* | 11/2004 | Johnson | 386/68 |
| 2005/0083413 A1 | 4/2005 | Reed et al. | |
| 2005/0094031 A1* | 5/2005 | Tecot et al. | 348/473 |
| 2006/0249573 A1* | 11/2006 | Berkun | 235/380 |
| 2007/0019836 A1* | 1/2007 | Thorwirth | 382/100 |
| 2007/0079001 A1* | 4/2007 | Ando et al. | 709/231 |
| 2007/0150462 A1* | 6/2007 | Nonaka et al. | 707/5 |
| 2007/0198582 A1* | 8/2007 | Yamamichi et al. | 707/104.1 |
| 2013/0212286 A1* | 8/2013 | Krishnakumar | H04L 67/148 709/227 |
| 2014/0173125 A1* | 6/2014 | Selvanandan | H04L 67/141 709/229 |
| 2016/0057135 A1* | 2/2016 | Jiang | H04L 63/0853 713/172 |
| 2016/0087920 A1* | 3/2016 | Odell | G06Q 10/107 709/206 |
| 2016/0212178 A1* | 7/2016 | Zhang | H04L 65/1066 |

\* cited by examiner

US 9,899,059 B2

METHOD OF MANAGEMENT OF A MULTIMEDIA PROGRAM, SERVER, TERMINALS, SIGNAL AND CORRESPONDING COMPUTER PROGRAMS

CROSS-REFERENCE TO RELATED APPLICATIONS

This application is the U.S. national phase of the International Patent Application No. PCT/FR2007/051826 filed Aug. 17, 2007, which claims the benefit of French Application No. 06 07496 filed Aug. 24, 2006, the entire content of which is incorporated herein by reference.

1 FIELD OF THE INVENTION

The field of the invention is that of the broadcasting of multimedia programs to terminals.

The invention thus relates in particular to the control of the continuity of playback of a digital multimedia content on various terminals, as well as to the sharing of such a content between several users.

The invention applies to any type of multimedia signal comprising sound, images and/or data, and for example to audiovisual programs.

As far as such audiovisual programs are concerned, it is today possible to view them on numerous types of terminals, such as televisions, personal computers, mobile telephones or personal assistants (PDA).

The invention relates in particular to the management of these operations.

2 BACKGROUND OF THE INVENTION

2.1 Prior Art

A first technical solution offered to a user is that he records the program concerned. Various types of recording devices, for example video recorders and DVD recorders, which make it possible to record programs on a recording medium are currently known. Hard-disk based devices are also offered.

These various recording devices allow a user to record the audiovisual program that he is currently viewing on a terminal, and to continue viewing this program subsequently. This later viewing can be done on the same communication terminal, or on another terminal, with the proviso that it exhibits the same technical characteristics, in particular in terms of standard, size and playback format.

Additionally, certain suppliers of digital television offer a subscriber the possibility of selecting, by payment, an audiovisual program from among a bundle of proposed programs. Once the transaction has been carried out, the user is then free to view the program as he pleases.

2.2 Drawbacks of the Prior Art

However, a drawback of these prior art techniques is that they require the presence, at the end user, of expensive recording devices that are often complex to implement.

Additionally, these techniques do not allow the viewing of an audiovisual program to be continued on a type of terminal other than the starting one. It is indeed impossible to begin, for example, viewing an audiovisual program on a television, then to resume this viewing on a personal assistant or a mobile telephone at an arbitrary instant of interruption of viewing. The current techniques cannot take into account the management of the data necessary for resuming the audiovisual program at an instant when viewing is in progress on another terminal.

Yet another drawback is that these techniques do not allow easy exchange with another user, short of transmitting to him, for example by electronic mail or "peer-to-peer" link, a complete file which has been recorded beforehand. In practice this is almost inconceivable, for reasons of available bandwidth and throughput, and furthermore difficult to implement in a simple manner, in particular for a non-specialist user.

Similar problems also appear for the various types of multimedia signals.

3 SUMMARY OF THE INVENTION

These objectives, as well as others which will appear hereinafter, are achieved according to the invention with the aid of a method for managing a multimedia program, played back by a terminal of a user, comprising the following steps:
  playback of said multimedia program, by a terminal;
  obtaining of a marking cue relating to an instant of playback of said multimedia program, associated with a marking request generated by order of a user of said terminal;
  obtaining of a marking cue in said multimedia program, associated with said marking request;
  use of said marking cue, by said user and/or by at least one second user, to play back said multimedia program later starting from said instant of playback.

Thus, in a simple and ergonomic way, the user has a data item which allows him to resume the playback at any moment, and/or to transmit it to another user.

According to a particular embodiment of the invention, said marking cue is a visual cue, intended to be displayed on a screen of said terminal.

This approach allows a very simple and intuitive implementation, even for a user unaccustomed to handling electronic apparatus. Specifically, the cue appears directly and visibly on his screen, and he can memorize it and store it simply.

According to this embodiment, said visual marking cue can in particular be displayed in the form of a two-dimensional code.

This technique is indeed well suited to playback on a screen, and to a snapshot, according to the approach detailed hereinafter.

The method of the invention can specifically comprise the following steps:
  taking of a snapshot of said visual marking cue with the aid of a terminal equipped with snapshot means;
  processing of said visual marking cue, so as to obtain a data item for driving a remote management server allowing access to said multimedia program.

According to this approach, which is very simple to implement, the user uses an apparatus capable of taking snapshots (for example a digital camera or a mobile telephone), to take a photo of the cue which appears on his screen. He does not need to process or to analyze this cue himself: the analysis and the decoding of the visual cue is carried out by the apparatus, or by a third-party element, to which the apparatus transmits the captured image.

According to a particular aspect of the invention, the method comprises a step of recording at least one portion of said multimedia program in a storage server.

According to case, the program can be recorded:
  systematically (or indeed be delivered right from the origin by a data stream (or "streaming") broadcasting server);
  on the basis of the request.

This storage allows, in a simple manner, later playback, by request of the user.

In this case, provision may be made for a step of deleting the program recorded on the storage server, after a predetermined expiry date.

This makes it possible to manage the server's storage capacity.

According to yet another particular aspect, the method comprises, in said multimedia terminal, the steps of:
  sending a request to said management server controlling a storage server containing said program, comprising said drive data item;
  later playback of said program, starting from said instant of playback, with the aid of a corresponding signal transmitted by a management server connected to said storage server.

In this way, the resumption of playback later is obtained simply and effectively, with a unique request deduced from the marking cue.

In this case, said request can furthermore comprise at least one of the cues belonging to the group comprising:
  an access key;
  an identifier of said user;
  an identifier of said multimedia program;
  a temporal reference corresponding to said instant of playback.

These cues make it possible to optimize the processing of the data, and for example to properly identify and control the user's rights.

According to a particular characteristic, said marking request can bring about a freezing of the image presented on said screen. It is on this still image that the marking cue appears.

The method can also, optionally, comprise the following steps:
  generation of a marking cue request to a management server;
  reception and playback of said marking cue.

According to another variant, marking cues can be introduced periodically into the multimedia signal (for example every second), for immediate playback if requested.

According to a particular application of the invention, the method can also comprise a step of sending said marking cue to at least one second user, so as to allow playback of said multimedia program by said second user or users, starting from said instant of playback.

This application makes it possible to share the program with a third party.

Said processing step can comprise, according to a particular aspect of the invention, the following steps:
  decoding of said marking cue, to obtain a management server interrogation data item;
  transmission of said interrogation data item to said management server;
  reception of cues descriptive of said multimedia program, transmitted by said management server.

In this way, the user can obtain cues descriptive of the program concerned (title, subject, channel, type of program, etc.).

The invention also relates to a multimedia terminal suited to the implementation of the method described above. Such a multimedia terminal comprises in particular:
  playback means for playing back a multimedia program on said multimedia terminal;
  generation means for generating a marking request, relating to an instant of playback of said multimedia program, generated by order of a user of said terminal;
  means of presentation, by said terminal, of a marking cue relating to an instant of playback in said multimedia program, so as to play back said multimedia program starting from said instant of playback.

By way of example, it may be a multimedia receiver, or a television.

The invention relates further to the method for managing a multimedia program, implemented in such a multimedia terminal. This method comprises in particular the following steps:
  playback of a multimedia program on a screen of said multimedia terminal;
  generation of a marking request, relating to an instant of playback of said multimedia program, generated by order of a user of said terminal;
  presentation, by said terminal, of a marking cue relating to an instant of playback in said multimedia program, so as to play back said multimedia program starting from said instant of playback.

According to a particular embodiment of the invention, said marking cue is a visual cue, intended to be displayed on a screen of said terminal.

According to another particular aspect of the invention, said marking cue is a visual cue, intended to be displayed on a screen of said terminal.

The invention also relates to a computer program product downloadable from a communication network and/or stored on a non-transitory medium readable by a computer and/or executable on a microprocessor, comprising program code instructions for implementing the steps of the method for managing a multimedia program implemented in a multimedia terminal such as described above.

According to another aspect of the invention, the latter relates to an acquisition terminal allowing the implementation of the management method described above. Such an acquisition terminal comprises in particular:
  acquisition means for acquiring a marking cue in a multimedia program, delivered by a multimedia terminal and corresponding to an instant of playback of said multimedia program;
  means for processing said marking cue, so as to play back said multimedia program starting from said instant of playback.

The invention relates further to a method for managing a multimedia program implemented in such an acquisition terminal, and comprising in particular the following steps:
  acquisition of a marking cue in a multimedia program, delivered by a multimedia terminal and corresponding to an instant of playback of said multimedia program;
  processing of said marking cue, so as to play back said multimedia program starting from said instant of playback.

This method of the invention can in particular comprise the following steps:
  taking of a snapshot of said visual marking cue with the aid of a terminal equipped with snapshot means;
  processing of said visual marking cue, so as to obtain a data item for driving a remote management server allowing access to said multimedia program.

According to a particular application, this method can also comprise a step of sending said marking cue to at least one second user, so as to allow playback of said multimedia program by said second user or users, starting from said instant of playback.

The invention also relates to a computer program product downloadable from a communication network and/or stored on a non-transitory medium readable by a computer and/or executable on a microprocessor, comprising program code instructions for implementing the steps of the method for managing a multimedia program implemented in an acquisition terminal such as described above.

The invention relates further to a server for managing a multimedia program, played back on a screen of a multimedia terminal of a user, characterized in that it comprises:
means for receiving a marking request, relating to an instant of playback, generated by order of a user of said terminal;
means for transmitting to said multimedia terminal a marking cue relating to an instant of playback of said multimedia program, associated with said marking request, intended to be played back by said terminal;
means for receiving a request for later transmission, based on the content of said marking cue;
means for controlling a later transmission of said multimedia program starting from said instant of playback, with the aid of said marking data item, to said user and/or at least one second user.

The invention relates further to the method for managing multimedia programs in such a management server, intended to be played back on a screen of a multimedia terminal of a user. This method comprises in particular the following steps:
reception of a marking request generated by order of a user of said terminal;
transmission to said multimedia terminal of a marking cue relating to an instant of playback of said multimedia program, associated with said marking request, intended to be played back by said terminal;
reception of a request for later transmission, based on the content of said marking cue;
later transmission of said multimedia program starting from said instant of playback, with the aid of said marking data item, to said user and/or at least one second user.

The invention also relates to a computer program product downloadable from a communication network and/or stored on a non-transitory medium readable by a computer and/or executable on a microprocessor, comprising program code instructions for implementing the steps of the method for managing a multimedia program implemented in a management server such as described above.

The invention relates finally to a signal for managing a multimedia program, transmitted by a control server to a multimedia terminal, for implementing the method described above. This signal comprises in particular control data in the form of a marking cue in a multimedia program, in response to a request of said multimedia terminal, and representative of an instant of playback.

For example, such a signal can comprise at least one of the following data fields:
a field bearing an access key;
a field bearing an identifier of said user;
a field bearing an identifier of said multimedia program;
a field bearing a temporal reference corresponding to said instant of playback.

4 DESCRIPTION OF THE DRAWINGS

Other characteristics and advantages of the invention will be more clearly apparent on reading the following description of a preferential embodiment, given by way of simple illustrative and nonlimiting example, and the appended drawings, among which:

FIG. 1 presents an illustration of an exemplary global architecture of the network allowing the continuity of the viewing and/or of the sharing of an audiovisual program;

FIG. 2 illustrates in a schematic manner the various steps implemented in an embodiment of the method of the invention;

FIG. 3 presents the structure of a management server according to an embodiment of the invention;

FIG. 4 presents an exemplary structure of an acquisition terminal implemented in the architecture of FIG. 1;

5 DETAILED DESCRIPTION OF THE INVENTION

5.1 Overview of the Principle of the Invention, in the Case of Audiovisual Programs The present invention therefore relates to the management of the playback of a multimedia program, played back initially by a first terminal of a user. It proposes a simple and effective solution for interrupting this playback, then resuming it later, without necessitating any recording or storage by this user. This resumption of playback can be performed on the first terminal, but also on a second terminal, which can if appropriate belong to a second user, to whom the first has provided the necessary cues.

The invention thus affords a simple and effective solution to the problem of managing the continuity of playback, and the sharing between two users of a multimedia program, on various types of communication terminals. These two applications (continuity and sharing) can of course be implemented independently of one another.

The embodiment described hereinafter relates to the management of audiovisual programs, and in particular the management of the continuity of the viewing and the sharing of an audiovisual program between two users on various types of communication terminals. The same approach can of course be implemented for other types of programs and signals.

Figure 1:
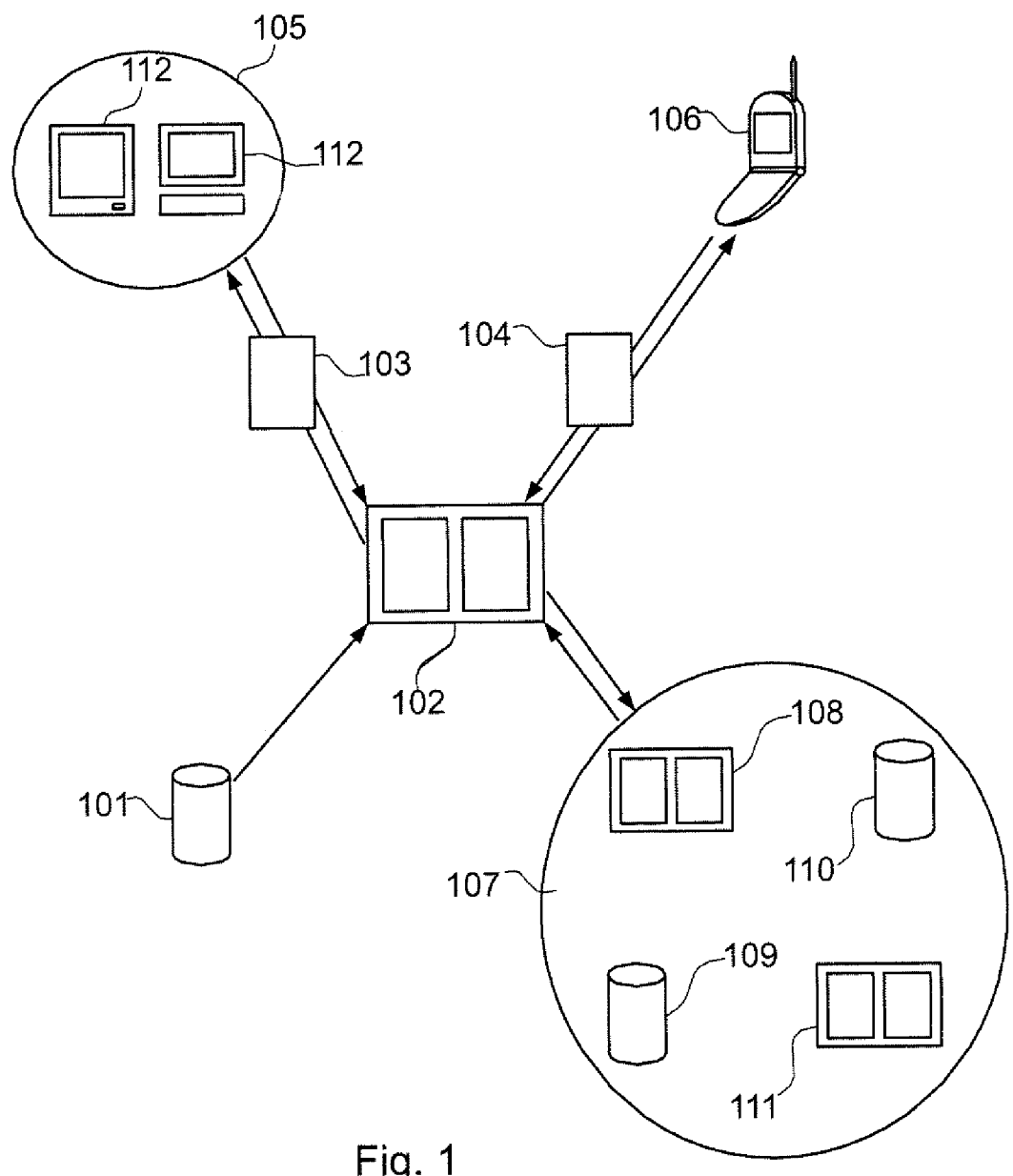

Thus, an exemplary global architecture of the network allowing the implementation of the invention in this application is presented in conjunction with FIG. 1.

A broadcasting platform 101 makes an audiovisual content (or program) available to a management server 102. This audiovisual content is transmitted or broadcast by the management server 102 to a domestic network 105 and to a digital services platform 107, so as to be played back on a first audiovisual terminal 112 of a user.

Figure 5:
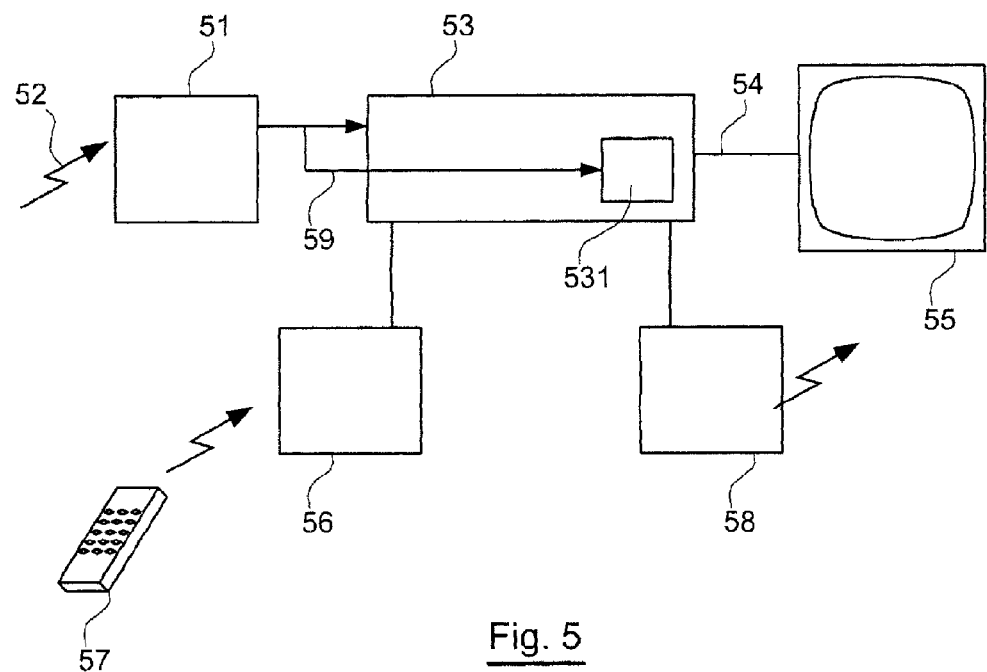
FIG. 5 is an exemplary structure of a playback terminal implemented in the architecture of FIG. 1.

An example of such a terminal 112 is illustrated in FIG. 5. It comprises means 51 for receiving an audiovisual signal 52, means 53 for processing the signal received 52 (by a microprocessor, a signal processor (DSP), a memory, etc.), which deliver a signal of images 54 that can be played back on a viewing screen 55.

The terminal 112 also comprises means for receiving commands 56 on the part of a remote control 57, and means 58 for issuing a request for implementing the invention, as described hereinafter. The processing means 53 comprise, in particular, specific means 531 for implementing the invention, according to the method presented hereinbelow.

The user can decide to interrupt the broadcasting of the audiovisual content on this first terminal 112 at any moment and thereafter resume the viewing thereof on a second terminal (or on the first terminal), at the instant of interruption of viewing, or if appropriate, a little before this instant.

According to the invention, when the user interrupts the viewing of the broadcast program, a marking cue is transmitted to the terminal by the management server 102. In the embodiment described, this is a visual marking cue, which can be displayed on the screen.

This cue is thereafter stored by the user. He can indeed take a photo of this visual marking cue by means of an acquisition terminal 106, for example a mobile telephone. This cue is then retained in the memory of the telephone so as to be able thereafter to be decoded and utilized at the moment desired by the user.

Figure 4:
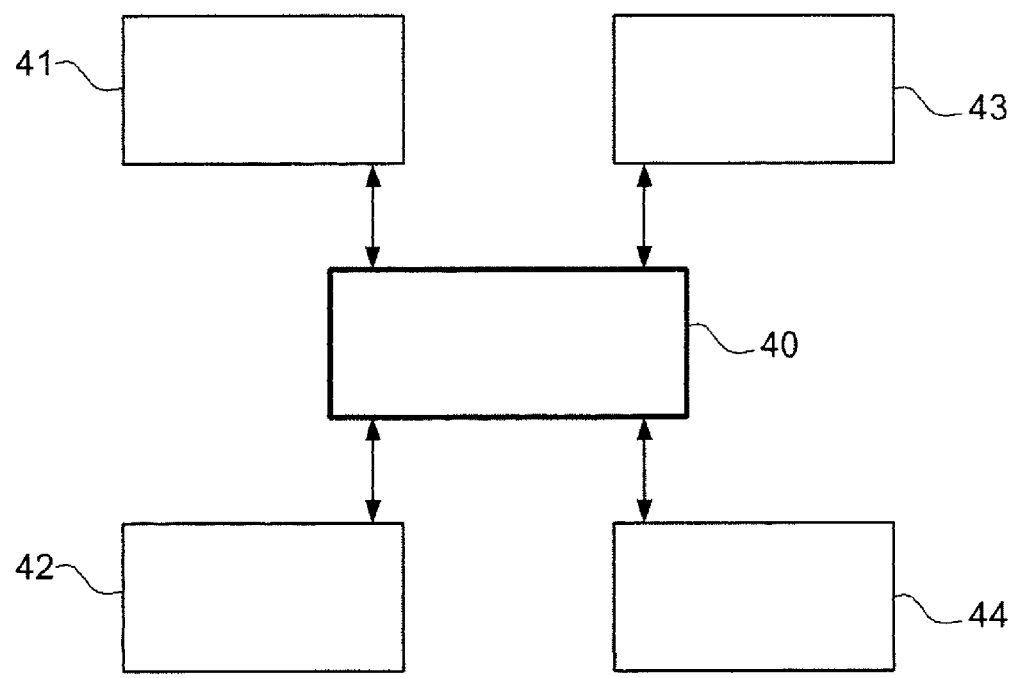

An exemplary structure of an acquisition terminal is illustrated schematically by FIG. 4. It comprises a processor 40 making it possible to control all the elements of the terminal, conventional snapshot means 43, a screen 41 making it possible to view the snapshots, means 44 for outputting recovered images possibly processed by the processor 40, and means for receiving cues outside the terminal. The reception means, the screen and/or the processor can be optional.

Once this cue has been decoded, the user can obtain, by way of the management server 102, descriptive cues concerning the audiovisual program concerned, and can, when he so desires, request the resumption of viewing on his acquisition terminal 106.

The invention thus relies on the implementation of a marking cue by a user while viewing an audiovisual program on a terminal.

The user does not have to concern himself with recording locally, the operations being managed by a remote server. He simply needs to memorize the marking cue, for example by taking a photograph of it.

5.2 Detailed Description of an Embodiment

Figure 2:
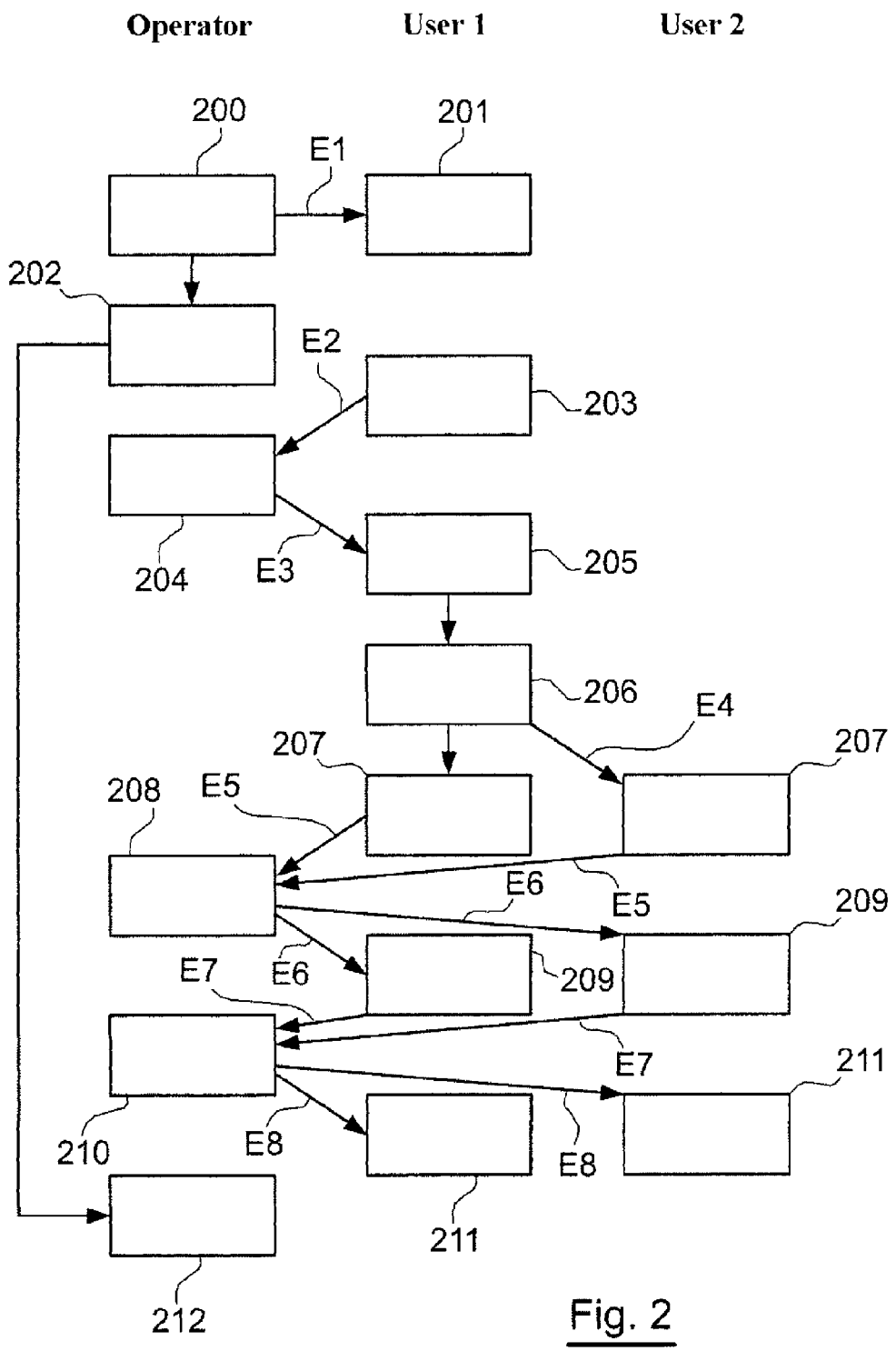

A preferential embodiment of the invention allowing the continuity of the viewing and/or of the sharing of an audiovisual program is presented hereinbelow in a more detailed manner with the aid of FIG. 2, which illustrates in a schematic manner the various steps implemented in this embodiment of the method of controlling the continuity and/or the sharing of an audiovisual program of the invention.

Initially, a first user views 201 an audiovisual program output 200 from a broadcasting platform 101. This audiovisual program is displayed for example on a screen of an audiovisual terminal 112. It is transmitted E1 by a management server 102 which effects the interface between the audiovisual terminal 112 and a broadcasting platform 101.

Figure 3:
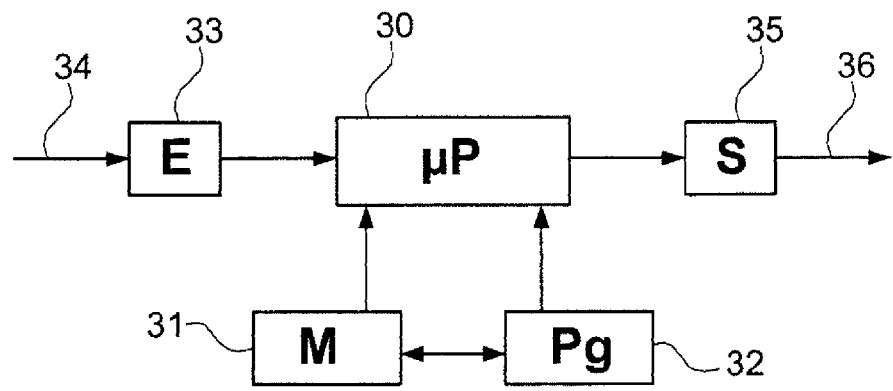

The structure of the management server 102 is illustrated schematically by FIG. 3. It comprises a memory M 31, and a processing unit 30 equipped with a microprocessor, which is driven by a computer program (or application) Pg. The processing unit 30 receives as input, via a network input interface module E 33, requests 34, which the microprocessor processes, according to the instructions of the program Pg 32, so as to generate responses 36, which are transmitted via a network output interface module S 35.

Simultaneously with this first step, a continuous recording 202 in its entirety of the audiovisual program, originating from the broadcasting platform 101, is carried out on a storage server 111 belonging to a digital services platform 107 and controlled by the management server 102.

In a second step 203 of the method according to this embodiment, the first user interrupts the broadcasting of the audiovisual program currently being viewed on his terminal 112. He triggers the interruption of the program by pressing a predetermined control of an interactor, for example a remote control.

As soon as the broadcasting of the program is interrupted by the first user, a marking request, corresponding to the current viewing instant, is generated by the terminal 112. This marking request leads to the freezing of the image on the screen of the terminal of this first user, and brings about the generation of a visual marking cue request, sent E2 via a gateway 103, for example a modem, to the management server 102.

The management server 102 generates in its turn a visual marking cue request to an application server 108, which returns a visual marking cue to the management server 102, corresponding to the audiovisual program being watched. This visual marking cue is thereafter forwarded E3 from the management server 102 to the audiovisual terminal 112.

In other embodiments, the construction and the transmission of the marking cue can of course be constructed in a different manner, and for example generated directly by the management server 102.

Figure 6:
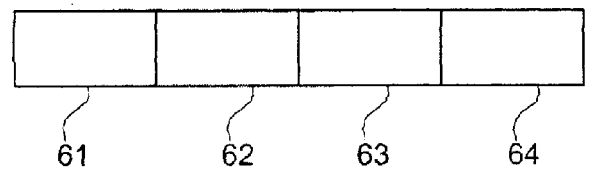
FIG. 6 is an exemplary structure of a management signal received by the terminal of FIG. 5.

This visual marking cue takes for example the form of a signal 59 (FIG. 5; processed by the means 531) whose structure is illustrated in FIG. 6. It comprises a set of fields 61 to 64 containing respectively at least the following identification cues:

an access key 61 which makes it possible to sporadically authorize the user (or another user) to view the audiovisual program;

an identifier 62 of the first user of the audiovisual program which makes it possible to authenticate the user;

an identifier 63 of the audiovisual program which provides characteristics of the program;

a temporal reference 64 corresponding to the instant of viewing.

In a third step 205 of the method, the visual marking cue is displayed overlaid on the image frozen on the screen of the user's terminal 112.

This visual marking cue can in particular be displayed in the form of a two-dimensional code, for example of "semacode" type. It appears overlaid on the image frozen on the screen of the audiovisual terminal 112.

Other variants of the two-dimensional graphical code can of course be used, for example a QR code, a DataMatrix, a Maxi code, etc. The code is preferably chosen in such a way that it can be photographed, then decoded from the photograph.

It can also be a digital or textual cue.

This visual marking cue will enable the first user to view his audiovisual program later starting from the current instant of viewing, if appropriate on another terminal (for example the one which enabled the photograph), or a second user to view this program.

Thus, in a fourth step 206 of the method according to this particular embodiment, the first user takes a snapshot of the visual marking cue with the aid of an acquisition terminal 106 equipped with snapshot means, for example a mobile telephone. This visual marking cue is then stored within the acquisition terminal 106, for example in the internal memory of the mobile telephone.

In the case where the cue is not an image, it can for example be stored in the audiovisual terminal and/or exchanged with another terminal through a suitable link (infrared, "Blue Tooth", MMS, etc.).

According to a particular use of this embodiment, the user can also send E4 through a suitable link (infrared, "Blue Tooth", MMS, etc.), by means of a gateway 104, the visual marking cue to a second user so as to enable him to view the audiovisual program starting from the instant of viewing.

A fifth step of the method, according to this embodiment of the invention, consists in processing the visual marking cue, recorded in the form of an image (snapshot) on an acquisition terminal 106, for example a radiocommunication terminal, so as to obtain the identification cues and a data item for driving the digital services platform 107 (or remote management server) allowing access to the audiovisual program. This fifth step of the method comprises several sub-steps.

A first sub-step is the decoding 207 of the visual marking cue by the user's acquisition terminal 106, so as to obtain descriptive cues and the drive data item. This decoding is carried out within the acquisition terminal 106 with the aid of suitable image processing algorithms.

In a second sub-step, an interrogation request is transmitted E5 to the management server 102 by the user so as to recover cues descriptive of the audiovisual program. The management server 102 then accesses a database 109 belonging to the digital service platform 107 so as to obtain 208 cues descriptive of the audiovisual program.

In another embodiment, provision may also be made for the marking cues E3 to directly comprise the set of these data. In this case, this latter sub-step is not implemented. Likewise, the first sub-step is not necessary if these marking cues directly comprise digital or text data.

A third sub-step is the transmission of these cues descriptive of the audiovisual program E6 by the management server 102 to the acquisition terminal 106.

The user can then take cognizance of these descriptive cues which comprise for example at least the following cues:
title;
broadcasting channel;
date and time of broadcasting;
summary, director, casting.

In a sixth step 209 of the method according to this embodiment of the invention, the user, after having obtained the descriptive cues E6 related to the decoding of the visual marking cue, orders the resumption of the viewing of the audiovisual program on his acquisition terminal 106. This action generates the sending of a request E7 to the management server 102, which comprises a drive data item allowing access to the stored audiovisual program.

The seventh step 211 of the method, according to this preferential embodiment, is then the later viewing of the audiovisual program starting from the current viewing instant, if appropriate on a different terminal from the first terminal.

For this purpose, the request sent during the sixth step 209 is processed 210 by the management server 102. It then orders the streaming server 110 of the digital services platform 107 to commence the broadcasting of the audiovisual program. The streaming server 110 thus accesses the storage server 111 so as to recover the content of the audiovisual program. The streaming server 110 then transmits E8, by way of the management server 102, the content of the audiovisual program to the acquisition terminal 106 of the user, who can henceforth resume viewing 211 the program on the screen of his acquisition terminal 106 starting from the current viewing instant preceding the interruption.

The management server can adapt, if necessary, the data stream to the reception characteristics of the terminal which requested the resumption of broadcasting.

An eighth step 212 is the deletion of the audiovisual program recorded on the storage server 111 after the lapsing of an expiry date and/or after viewing 211.

According to a variant of this particular embodiment of the invention, the user can also control the broadcasting of the audiovisual program on his acquisition terminal 106. He can thus speed up, slow down, rewind or even pause the broadcasting of the audiovisual program.

5.3 First Exemplary Application

A first exemplary application of the method described is the management of the continuity of the viewing of an audiovisual program on various terminals.

A user, who has subscribed to a digital television service and has access to one or more bundles of digital channels, can view a program on his television 112, or on any other terminal permitting digital audiovisual program broadcasting, for example a computer, a mobile telephone or a personal assistant (PDA).

Viewing 201 an audiovisual program on his television 112, the user is compelled to absent himself and to interrupt the viewing of this program. However, to resume viewing the program, for example on his mobile telephone, subsequently, he interrupts 203 the playback in progress by pressing the button of his remote control.

This operation brings about the freezing of the image on the screen of the television 112 and the appearance of a two-dimensional graphical code overlaid on the frozen image 205. The user can then use this visual marking cue for a subsequent resumption, by taking a photo 206 of the graphical code displayed on the screen of his television 112, with the aid of the camera built into his mobile telephone 106.

Once installed in the bus, the user, wishing to resume the viewing of the audiovisual program on his mobile telephone 106, commences the decoding of the 2D graphical code, stored in the memory of his telephone 207. He then recovers E6 the cues descriptive of the program that he was viewing when he had to absent himself.

The user can henceforth order the resumption of the viewing 209 of his program on his mobile telephone 106. He thus views, later, the audiovisual program starting from the instant of interruption 211 until the end.

5.4 Second Exemplary Application

A second exemplary application of the method, according to the aforesaid embodiment, is the sharing of a sequence of an audiovisual program between two users.

A user, who is viewing 201 on his television 112 a transmission originating from a bundle of digital channels, decides to inform one of his friends of the broadcasting of this transmission. He stops the broadcasting of this program 203 by pressing the button provided for this purpose on his remote control. The image on the television screen then freezes and a two-dimensional graphical code appears overlaid 205 that he decides to send to his friend.

He then uses his mobile telephone 106 to photograph the graphical code 206, which is then stored in the internal memory of the telephone. The user thereafter sends the photograph of the graphical code to his friend E4 with the aid of a multimedia message, for example MMS (standing for "Multimedia Messaging Service").

The user's friend can, once the message containing the graphical code is received, activate the decoding of the graphical code 207 on his own mobile telephone. He then obtains the identification cues and a drive data item allowing access to the transmission. After sending an interrogation data item, he can also obtain the cues descriptive of the transmission watched by the user. Furnished with these descriptive cues, the user's friend can decide to commence viewing the report 209 when he so wishes.

After having requested the commencement of viewing 209, the user's friend can begin to watch the transmission starting from the instant of interruption 211, or slightly before. He also has the possibility of rewinding, pausing, fast-forwarding or even stopping the broadcasting of the transmission on the screen of his mobile telephone 106.

5.5 Other Embodiments

According to another preferential embodiment, provision may be made to put in place a step of recording the audiovisual program watched by the user, only starting from the stopping of the broadcasting of the program by the user.

Additionally, the invention is not limited to mobile telephone type terminals, but can apply more generally to numerous types of terminals, such as PDAs, micro-computers, etc.

The invention is of course not limited to the case of a single marking cue, but can on the contrary make it possible to generate several marking cues, for one or more multimedia streams, thereby making it possible in particular to address distinct marking cues for one and the same stream, corresponding or not to different instants, to several people.

The invention claimed is:

1. A computer hardware-implemented method for controlling the continuity of playback of a multimedia program, said method comprising:
   on a first terminal device:
      receiving, by a reception means, a multimedia program from a remote management server device;
      playing back of said multimedia program on a screen of said first terminal device;
      transmitting, to the remote management server device, a marking request generated by a user of said first terminal device at an instant of playback of said multimedia program;
      obtaining of a marking cue from the remote management server device, said marking cue relating to the instant of playback, associated with the marking request, said marking cue is a visual cue, intended to be displayed on the screen of said first terminal device in the form of a two-dimensional code;
   on a second terminal device:
      taking, by a snapshot means, a snapshot of said visual marking cue;
      processing, by said second terminal device or by another terminal device to which said marking cue has been transferred, of said visual marking cue, so as to obtain a data item for driving said remote management server device allowing access to said multimedia program, so as to play back by said second terminal device or by said another terminal device, said multimedia program starting from said instant of playback.

2. The method as claimed in claim 1, further comprising a step of recording at least one portion of said multimedia program in a storage server device.

3. The method as claimed in claim 1, wherein said second terminal further performs the steps of:
   sending a request to the management server device, the request comprising said drive data item;
   playing back said multimedia program, starting from said instant of playback, with the aid of a corresponding signal transmitted by the management server device.

4. The method as claimed in claim 1, wherein said request comprises at least one of the cues selected from the group consisting of:
   an access key;
   an identifier of said user;
   an identifier of said multimedia program; and
   a temporal reference corresponding to said instant of playback.

5. The method as claimed in claim 1, further comprising a step of the second terminal device sending said marking cue to at least one second user, so as to allow playback of said multimedia program by said second user or users, starting from said instant of playback.

6. The method as claimed in claim 1, wherein said processing step comprises the following steps:
   decoding of said marking cue, to obtain a management server interrogation data item;
   transmission of said interrogation data item to said remote management server device;
   reception of cues descriptive of said multimedia program, transmitted by said remote management server device.

7. A first terminal, configured to operate in a system for controlling the continuity of playback of a multimedia program, wherein the first terminal is implemented as a computer hardware device, the first terminal comprising:
   reception means for receiving a multimedia program from a remote management server device;
   a multimedia player for playing back the multimedia program on a screen said first terminal;
   a controller for generating a marking request, relating to an instant of playback of said multimedia program, generated by order of a user of said first terminal;
   a transmitter to transmit the marking request to the remote management server device;
   reception means for obtaining of a marking cue from the remote management server device, said marking cue relating to the instant of playback associated with the marking request;
   a screen for presentation, by said first terminal, of a marking cue, said marking cue is a visual marking cue in the form of a two-dimensional code, said presentation being suited for taking of a snapshot of said marking cue with the aid of a second terminal, the processing by said second terminal or by another terminal to which said marking cue has been transferred, of said visual marking cue allowing to obtain a data item for driving said remote management server device for allowing access to said multimedia program, so as to play back said multimedia program starting from said instant of playback on said second terminal or on said another terminal.

8. A computer hardware-implemented method for controlling the continuity of playback of a multimedia program, implemented in a first terminal, comprising the steps:
   receiving, by a reception means, a multimedia program from a remote management server device;
   playing back of a multimedia program on a screen of said first terminal;

generating a marking request, relating to an instant of playback of said multimedia program, generated by order of a user of said first terminal;

transmitting the marking request to a remote management server device;

presenting, by said first terminal, of a marking cue obtained from a remote management server device, relating to an instant of playback in said multimedia program, said marking cue being a visual marking cue in the form of a two-dimensional code, said presentation being suited for taking of a snapshot of said marking cue with the aid of a second terminal, the processing by said second terminal or by another terminal to which said marking cue has been transferred, of said visual marking cue allowing to obtain a data item for driving said remote management server device for allowing access to said multimedia program, so as to play back said multimedia program starting from said instant of playback, on said second terminal or on said another terminal.

9. A non-transitory computer-readable medium containing a computer program product,
said product comprising program code instructions for implementing the steps of the method for managing a multimedia program implemented in a first terminal, as claimed in claim 8.

\* \* \* \* \*